Patented Dec. 15, 1925.

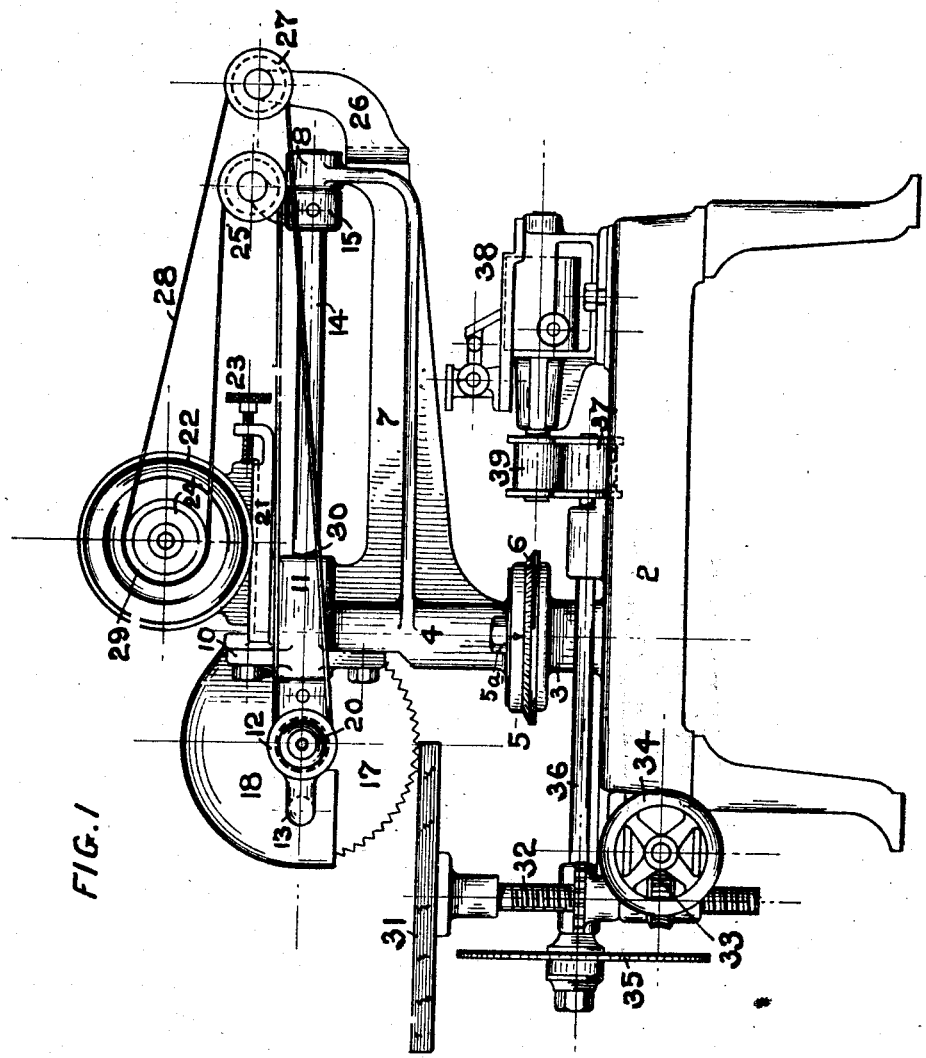

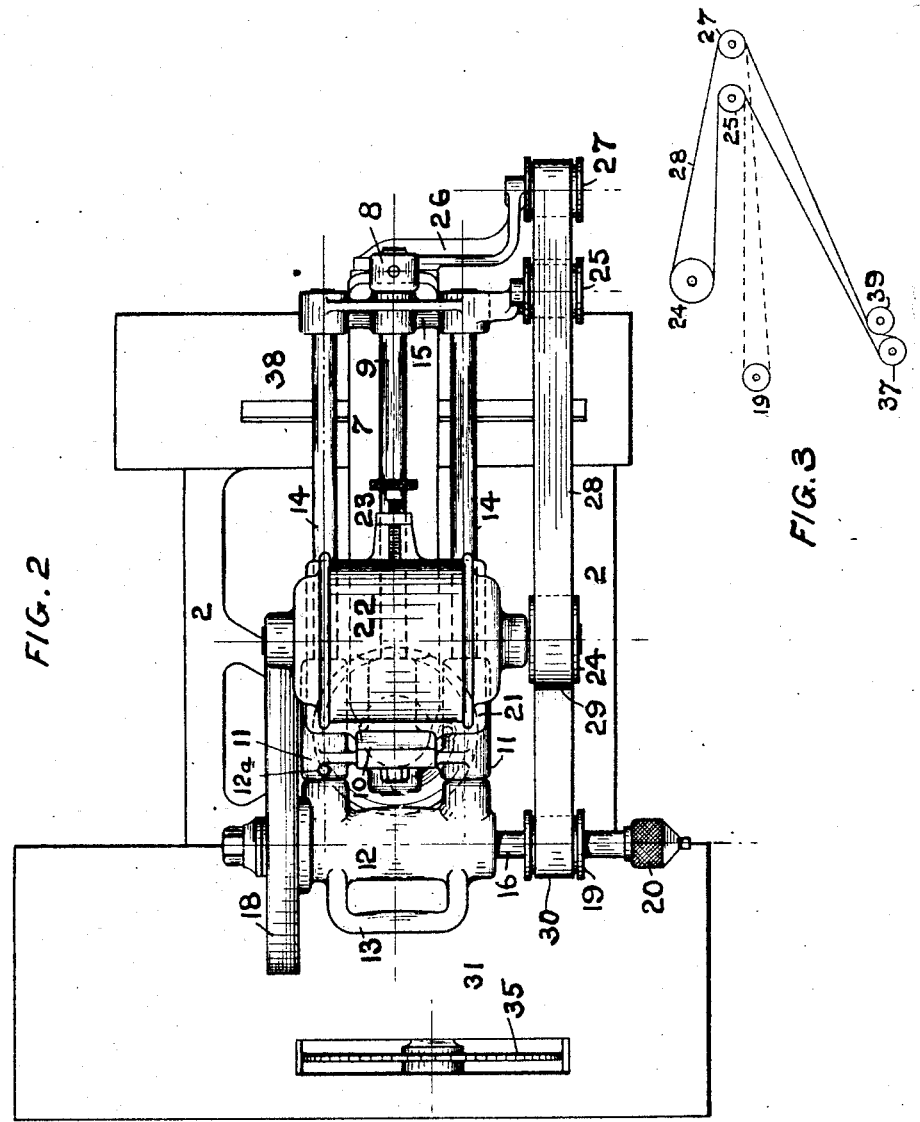

1,565,926

UNITED STATES PATENT OFFICE.

SAMUEL W. GREEN, OF PHILADELPHIA, PENNSYLVANIA.

WOODWORKING MACHINE.

Application filed July 23, 1923. Serial No. 653,080.

*To all whom it may concern:*

Be it known that I, SAMUEL W. GREEN, a citizen of the United States, and resident of Philadelphia, county of Philadelphia, State of Pennsylvania, have invented an Improvement in Woodworking Machines, of which the following is a specification.

My invention has for an object the construction of a woodworking machine especially adapted for performing operations of sawing, such as cross cutting, mitering and kindred operations, and which, by suitable adjustment, may also be adapted for jointing and rip sawing, the machine being self-contained and having universal capacity for doing wood work which involves sawing and jointer work.

The object is furthermore to so construct the machine that it is portable and easily transferred and usable at the place where the work is to be done.

Heretofore, in machines of similar character, it has been customary to mount the cross cut saw upon an adjustable frame which was movable in the direction of the plane of the saw, said frame being carried upon a vertical adjustable turn-table or support, whereby it could be adjusted in a horizontal plane about a vertical axis, but in all of these cases, the motor which has been belted to the saw mandrel has been supported at a great distance from the vertical axis about which the frame is adjusted, the motor either being secured to the sliding frame carrying the cross cut saw or to a rearwardly extended arm at a great distance from the vertical axis of the frame, the former imposing great weight upon the sliding frame and interfering with the freedom of operation, and the latter producing a vibration which interferes more or less with the accuracy of the saw cut. It has been found that the great weight of the motor, when driving the operating belt at a high speed and when arranged at a distance from the vertical axis of the adjustable frame, causes considerable wear upon the guides of the frame and shortens the effective life of the machine as a whole.

By my improvements, these objections to existing woodworking machines are overcome, as the entire weight of the motor is removed from the carriage and from the rearwardly extending arms beyond the carriage, and is positioned immediately adjacent to the vertical axis of the adjustable frame and otherwise connected by power transmitting means with the saw mandrels and jointer, whereby the vibration of the motor is reduced to a minimum and its weight removed, not only in its effect upon the operation of the sliding carriage carrying the saw, but also as to exerting an objectionable load on the adjustable frame in respect to its adjustment about the vertical axis.

Considering my invention more particularly as to the construction of the machine, I provide a suitable frame preferably adjustable about a vertical axis, said frame having a rearwardly extending guide arm carrying at its rear end a guide pulley, a sliding carriage carrying a saw journaled thereon, the mandrel of which is provided with a pulley and said sliding carriage guided upon the adjustable frame adjacent to its vertical axis, and also having rearwardly extending guiding means guided upon the rearwardly extending guide arm of the adjustable frame, said carriage also provided with a pulley at its rear end, and a motor preferably electric supported upon the adjustable frame adjacent to its vertical axis and belted to the pulley on the saw mandrel by an endless belt, one portion of which passes about the pulley on the end of the rearwardly extending guide arm and the other portion extending about the pulley on the rear of the adjustable frame, the construction being such that the carriage and the saw carried thereby may be manually adjusted without moving the motor and maintaining the power transmitting connection with the motor by compensation in the belt transmission due to the movement of the guide pulley on the carriage being exactly equal to the movement of the pulley on the saw mandrel.

By this construction, no strain is put upon the adjustable carriage by reason of the weight of the motor; and such vibration as necessarily results in the fast running motor is absorbed by the adjustable frame adjacent to its vertical axis and is not caused to produce objectionable vibrations in the machine such as occurs when the motor is supported upon a lateral arm or upon the rear of the carriage, as found in constructions heretofore employed.

In my construction, the adjustable carriage has no other work to perform than such as is put upon it by the action of the saw and the adjustment of the belt for keeping it under normal or uniform tension.

My invention also embodies other details of construction which, together with the features above referred to, will be better understood by reference to the drawings, in which:

Fig. 1 is a side elevation of a woodworking machine embodying my improvements; Fig. 2 is a plan view of the same; and Fig. 3 is a diagram illustrating the arrangement of the belt when operating the rip saw and jointer.

2 is the main frame of the machine and may be supported upon legs or otherwise as found convenient, and the frame may be of any suitable construction. 3 is an upright pedestal upon which the frame 4 is secured and adjusted with capacity to swing about a vertical axis, the adjustment being permitted by the turn-table 5 and the extent of the adjustment being shown by the scale 6 upon one portion of the turn-table and a pointer on the other portion. The adjustable frame 4 may be clamped in any suitable position of adjustment by a clamping screw 5ª. The adjustable frame 4 is provided with a rearwardly extending arm 7 having at its rear end a hub 8 which supports and carries the rear end of a guide arm 9, and said rear end of the frame and guide arm is provided with a bracket 26 upon whose free end is journaled a belt pulley 27. The frame 4 is also provided, on opposite sides of the guide arm 9, with guides 11 for the adjustable carriage 12 which carries the saw 17, said guides being in a casting bolted to the top of the frame 4 at 10. The carriage 12 is provided at the forward end with a handle 13 by which it may be grasped and shifted back and forth by the operator.

In the head of the sliding carriage is journaled a mandrel 16 carrying, at one end the cross cut saw 17 and guard 18 therefor, and at the other end, the drill chuck 20 and a band wheel 19 intermediate of the chuck and the head of the carriage. It will further be seen that the carriage also comprises two rearwardly extending rods 14 slidable through the guides 11 on the adjustable frame, said rods being secured at their rear ends in a transverse frame 15 which is guided upon the rearwardly extending guide arm 9. The frame 15 is extended to one side and carries thereat the pulley 25. It will be seen that the carriage is guided in the guides 11 adjacent to the vertical axis of the frame 4, and is also guided upon the rear end of the guide arm 9, so that it has widely separated points of guiding support.

Secured to the upper part of the adjustable frame 4, adjacent to the vertical axis thereof, is a motor support 21 upon which an electric motor 22 is placed and adjustable horizontally by the adjusting devices 23. The weight of this motor is, therefore, supported close to the axis of the adjustable frame 4 and any vibration, due to the motor, is transmitted to the rigid and stable portions of the machine instead of to the light adjustable frame or to the end of the lateral overhanging arm from the said adjustable frame 4 and at a distance from the axis thereof, as has heretofore been the case. The electric motor 22 is provided with a belt wheel 24 and said belt wheel pulleys 19, 25 and 27 are all in substantially the same vertical plane, as will be understood by reference to Fig. 2.

The belt 28, at one end, passes about the belt wheel 24 of the motor, as at 29, and at the other end, about the belt wheel 19 on the saw mandrel 16, as at 30, and the intermediate portions of the belt are looped about the pulleys 25 and 27, as clearly shown in Fig. 1. The tension of the belt may be assured by the tension adjusting devices 23 which permit reasonable adjustment of the motor upon its support 21.

It will now be understood that as the carriage 12 is moved to the left, the pulleys 19 and 25 move with it, and as they both move to the same extent, the additional belt length required to bridge the distance between the pulleys 19 and 27 is provided by the corresponding degrees in the distance between the motor pulley 24 and pulley 25 on the carriage, thereby insuring the belt remaining at the same tension for all adjustments of the carriage, and, moreover, allowing the carriage to be shifted without in any manner affecting the real transmission of power from the motor to the saw mandrel.

In connection with the capacity for adjustment, it will be noted that the pulley 25 bears a relation to the pulleys 24 and 19, such that the belt length from the pulley 24 to the pulley 25, and from the pulley 19 to the pulley 25 are parallel and are also parallel to the guide 9 for the carriage, and, therefore, no amount of adjustment of the latter will materially affect the tension of the belt, so that the transmission is very efficient and at the same time capable of transmitting the power required without undue loss by friction.

31 is a table for supporting the material to be sawed and said table may be adjusted vertically relatively to the main frame of the machine and the saw 17 by means of supporting screws 32 and worm wheel gearing 33, operated by hand wheel 34. Any other suitable manner of supporting and adjusting the table 31 may be employed, if so desired, and I in no wise restrict myself in this respect.

It will now be understood that the saw may operate upon the material resting upon the table and by proper adjustment of the adjustable frame 4, the saw cutting may be produced at right angles or at any other angle to the length of the material desired; and the depth of the saw cut, whether entirely through or partly through the material may be insured by the proper adjustment of the table.

35 represents a rip saw and is secured to a shaft 36 suitably journaled on the main frame, so that the saw is arranged below the table 31 and by lowering the table sufficiently, may project through the same for becoming operative for ripping lumber guided upon the table. The saws 17 and 35 are sufficiently separated as to their vertical positions that when the table is adjusted in connection with the saw 17, the rip saw is wholly below the table, and when the table is adjusted for operation with the rip saw, it is sufficiently lowered below the cross cut saw 17 as to insure the material being ripped to be free of manipulation without contact with the saw 17. The other end of the rip saw shaft 36 is provided with a belt pulley 37.

At the opposite side of the main frame 2 to which the rip saw 35 is located, I arrange a jointer 38 of any suitable construction, the cutter thereof being rotated by a belt wheel 39 which is so located with respect to the pulley 37 of the rip saw, that a belt passing between these pulleys over one end, the other may drive them both at the same time in opposite directions, as has heretofore been customary in machines of this class.

It will now be understood that if the rip saw and the jointer is to be operated instead of the cross saw, the adjustable frame 4 is swung around its vertical axis on pedestal 3 for 90° and is secured in such position of adjustment by the clamping screw 5ª. When this position is assumed, the pulleys 24, 25 and 27 will be in the same vertical plane with the pulleys 37 and 39, and thereupon the looped end 30 of the belt 28 will be disengaged from the pulley 19 and applied about the pulley 37 and continuing upward under the pulley 39, as indicated in Fig. 3. When so adjusted, the operation of the motor 22 will be to drive the rip saw and the jointer instead of operating the cross cut saw 17. Any adjustment as to tension of the belt may be provided by the adjustment means 23, and as the belt is partly guided by the pulley 25 on the sliding carriage, the same is locked against movement by a suitable clamping screw 12ª (Fig. 2).

When adjusting the belt from the pulley 19 to the pulleys 37 and 39, the necessary slack in the belt may readily be obtained by first reducing the tension of the screw 23, and when the belt is removed from the pulley 19 or from both pulleys 19 and 25 for ready freeing of the belt from the pulley 19 and the mandrel thereof, it may then be placed in position about the pulleys 37 and 39 and after being again adjusted to the pulley 25, the carriage 12 would be pushed back into tension position, as shown, and clamped by the screw 12ª or other suitable means and thereafter, the working tension be provided by the adjusting screw 23 for shifting the motor to the desired extent.

It will thus be seen that the machine as a whole, constitutes a universal wood working machine but the special improvements therein constituting the basis of my invention is more particularly directed to that portion of the machine in connection with the cross cut saw support and its operating means It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent is:—

1. A woodworking machine of the class described, wherein there is a main frame having a vertically adjustable table for the material to be operated upon, an adjustable frame movable as a unit independent of the table and journaled upon the main frame so as to be at all time horizontally movable about a vertical axis, and a horizontally reciprocable carriage at all times supported by and movable on the adjustable frame at right angles to the vertical axis thereof, said carriage having a saw and mandrel journaled thereon and driven by a motor forming a part of the machine, said motor arranged upon the upper portion of the adjustable frame adjacent to the vertical axis thereof and movable with said frame, and a compensating power transmitting means between the motor and saw mandrel, whereby the carriage may be freely reciprocated horizontally upon the adjustable frame, while maintaining the power transmitting connection between the saw mandrel and the motor.

2. In a woodworking machine, the combination with a main frame and table for holding the material to be operated upon, of an adjustable frame supported by the main frame and movable about a vertical axis, a horizontally reciprocable carriage movable with the adjustable frame, said carriage provided with a saw and mandrel therefor journaled on the carriage, a motor supported upon the adjustable frame and independently of the carriage, and a power transmission means comprising a belt operated by the motor for driving the saw mandrel, and wherein further, a rearwardly extending guiding means is provided for the carriage comprising a rearward extension of the adjustable frame and a horizontal guide arm thereon having its forward end secured to the adjustable frame near its vertical axis and its rear end secured to the rearward extension thereof, and the reciprocable carriage includes two rearwardly extending rods guided upon the adjustable frame adjacent to its vertical axis and connected at their rear ends by a transverse frame which is guided upon and steadied by the horizontal rearwardly extending guide arm of the adjustable frame and provided with an idler pulley for the belt transmission means.

3. In a woodworking machine of the class described, a main frame having a vertically adjustable table for the materials to be operated upon, combined with an adjustable frame independent of the table and movable about a vertical axis relatively to the table and main frame, said adjustable frame having laterally extending guide portions and provided at the extreme top and above and adjacent to the axis of oscillation with a motor support, a horizontally reciprocable carriage having rearwardly extending rods guided in the lateral guides on the adjustable frame, said carriage having a saw mandrel journaled thereon and provided at one end with a saw and at the other end with a pulley, a motor secured to the support on the upper part of the adjustable frame and having a driving pulley adjacent to the axis of the said frame, a compensating endless belt extending at one end about the driving pulley of the motor and at the other end about the pulley on the saw mandrel and having its two intermediate parts looped backward to the rear of the vertical axis of the adjustable frame, and separate pulleys for guiding said looped portions respectively connected with the reciprocable carriage and with the adjustable frame.

In testimony of which invention, I hereunto set my hand.

SAMUEL W. GREEN.